United States Patent [19]

Bedzyk

[11] Patent Number: 5,089,078
[45] Date of Patent: Feb. 18, 1992

[54] APPARATUS FOR ALIGNING AN OPTICAL DEVICE

[75] Inventor: Mark D. Bedzyk, Rochester, N.Y.

[73] Assignee: Eastman Kodak Company, Rochester, N.Y.

[21] Appl. No.: 628,979

[22] Filed: Dec. 17, 1990

[51] Int. Cl.⁵ ............................................ G01D 21/00
[52] U.S. Cl. ................................. 156/378; 156/556; 156/275.5; 156/64; 359/896; 359/216
[58] Field of Search ..................... 156/275.5, 180, 64, 156/272, 378, 379, 556, 537, 293, 295; 350/417, 537, 542, 545

[56] References Cited

U.S. PATENT DOCUMENTS

| | | | |
|---|---|---|---|
| 4,388,128 | 6/1983 | Ogawa et al. | 156/64 |
| 4,418,284 | 11/1983 | Ogawa et al. | 250/578 |
| 4,443,494 | 4/1984 | Gonser | 156/64 |
| 4,496,416 | 1/1985 | Machler et al. | 156/293 |
| 4,509,251 | 4/1985 | Gyi et al. | 39/603 |
| 4,537,827 | 8/1985 | Little et al. | 428/409 |
| 4,857,130 | 8/1989 | Curtis | 156/292 |
| 4,917,751 | 4/1990 | Ohta et al. | 156/272.2 |

FOREIGN PATENT DOCUMENTS 61-278581 12/1986 Japan ........................... 156/64

*Primary Examiner*—David A. Simmons
*Assistant Examiner*—Robert Barker
*Attorney, Agent, or Firm*—G. Herman Childress

[57] ABSTRACT

A polygon of a laser optical system is supported by a housing and requires precise alignment with respect to a base for proper operation of the optical system. A fixture has a base that is mounted for rotation about an axis. A plurality of adjustable pad assemblies are located between the base and the housing. Each pad assembly includes a mounting plate that is positioned on the base and a bushing that is secured to the housing. A compressible ring surrounds a surface on the plate that receives an adhesive. Pushers carried by the base engage the housing and urge the housing toward the base. The pushers are individually adjustable to control the position of the housing relative to the base about a plurality of axes. An optical instrument measures the angular position of the optical device on the housing and, when it is properly positioned, it is held until the adhesive cures to bond the mounting plate and bushing together.

6 Claims, 5 Drawing Sheets

APPARATUS FOR ALIGNING AN OPTICAL DEVICE

CROSS REFERENCE TO RELATED APPLICATION

Reference is made to commonly-assigned copending U.S. patent application No. 628,289, entitled "Adjustable Pad Assembly", filed on even date herewith in the name of Mark D. Bedzyk.

BACKGROUND OF THE INVENTION

The present invention relates to an apparatus for aligning a polygon or other optical device relative to a base so that the polygon can be removed from the base and remounted on similar bases without requiring re-alignment.

Various kinds of apparatus are known for adjusting and mounting optical devices. For example, U.S. PAT. NO. 4,496,416, issued Jan. 29, 1985 relates to method and apparatus for adjusting and mounting optical components in optical instruments. The apparatus and method of this patent relates to positioning of an optical component relative to other portions of an instrument, and then after adjustment is completed rigidly attaching the instrument to the optical device in a permanent manner. For example, an optical element can be adjusted and firmly mounted in place in a telescope using the method and apparatus of this patent.

The method and apparatus disclosed in U.S. PAT. No. 4,496,416 requires an optical element to be adjusted with respect to a particular instrument and then an adhesive bonds the element to the instrument. If the optical element needs to be replaced, the procedure would have to be repeated. Thus, the method and apparatus of this patent does not enable an optical instrument or portions thereof to be replaced in the field without realigment and positioning of the element.

U.S. PAT. NO. 4,537,827, issued Aug. 27, 1985 relates to an optically flat semiconductor base plate structure. More specifically, the patent discloses a silicon wafer being mounted on a base plate for inclusion in an optical device, such as a liquid crystal light valve. An optically flat surface presses the silicon wafer toward a base plate and against an o-ring seal surrounding a fluid adhesive, and the fluid adhesive hydrostatically distributes the force of compression to guarantee optical flatness and self-compensation for the amount of fluid adhesive surrounded by the o-ring.

The apparatus of U.S. Pat. No. 4,537,827 is designed to produce an optically flat element and utilizes hydrostatic pressure to hold the semiconductor device flat while the adhesive cures. The need to produce optically flat devices increases the cost of the fixture and requires the application of hydrostatic forces. The ring which holds the adhesive in place can expand in a radial direction when the element is pressed flat to compensate for excess adhesive. Thus, the outer diameter of the device varies as a function of the quantity of adhesive. The resulting variation in diameter of the device may be acceptable in the manufacture of a semiconductor device, but can present a problem in an alignment apparatus where relative dimensions between certain parts needs to be controlled.

Laser printers and other optical devices require precise positioning of optical elements, such as a rotatable polygon having multi-faceted reflecting mirrored surfaces in order to achieve the accuracy and quality required for laser printers. Such optical systems can be assembled and precisely aligned to each printer as it is produced. However, if subsequent replacement of the polygon is required then the entire alignment operation must be repeated, and such is difficult to achieve at a customer's location. While small printers may be easily transported to a repair facility, many printers incorporating laser optical systems are quite large and it is inconvenient and expensive to transport the entire printer to a repair facility. This, there is a need to align an optical device, such as a polygon, prior to its installation in a printer on the like so that the aligned optical device can be mounted in the printer during assembly of the printer, or later during repair or replacement of the optical device while obtaining precise positioning of the device in the printer.

SUMMARY OF THE INVENTION

It is an object of the invention to align an optical device supported by a housing so that the device and housing can then be assembled in an optical system without requiring realignment of the optical device. Another object of the invention is to provide an apparatus for accurately adjusting the angular attitude of the axis of rotation of a polygon for a laser scanner with respect to other elements of the scanner optics, which is relatively inexpensive and which avoids the problems of the prior art mentioned hereinbefore.

These objects are obtained by the apparatus described in more detail later, for aligning an optical device on a housing. The apparatus includes a fixture having a base mounted for rotation about an axis. A plurality of adjustable pad assemblies are provided. Each assembly has a mounting plate that is removably positioned on the base of the fixture, and a bushing that is secured to the housing of the optical device. Each assembly also has a compressible member supported by the mounting plate with a portion of the compressible member projecting from the plate to form an area on the plate for receiving an adhesive. The housing of the optical device is located on the base by positioning the mounting plates of the assemblies in spaced relation on the base and securing the bushings of the assemblies to the housing. Then the bushings are brought into engagement with the compressible members of the assemblies. A plurality of pushers carried by the base are engageable with the housing for urging the housing toward the base. The pushers are independently adjustable to control the position of the housing relative to the base about a plurality of axes. The pushers are effective to urge the bushings toward the mounting plates and squeeze the compressible members to bring the bushings into contact with the adhesive. Means are provided for measuring the angular position of the optical device on the housing.

The invention and its object and advantages will become more apparent in the Detailed Description of the Preferred Embodiment presented below.

BRIEF DESCRIPTION OF THE DRAWINGS

In the Detailed Description of the Preferred Embodiment of the invention presented below, reference is made to the accompanying drawings, in which.

DETAILED DESCRIPTION OF THE PREFERRED EMBODIMENT

Figure 1:
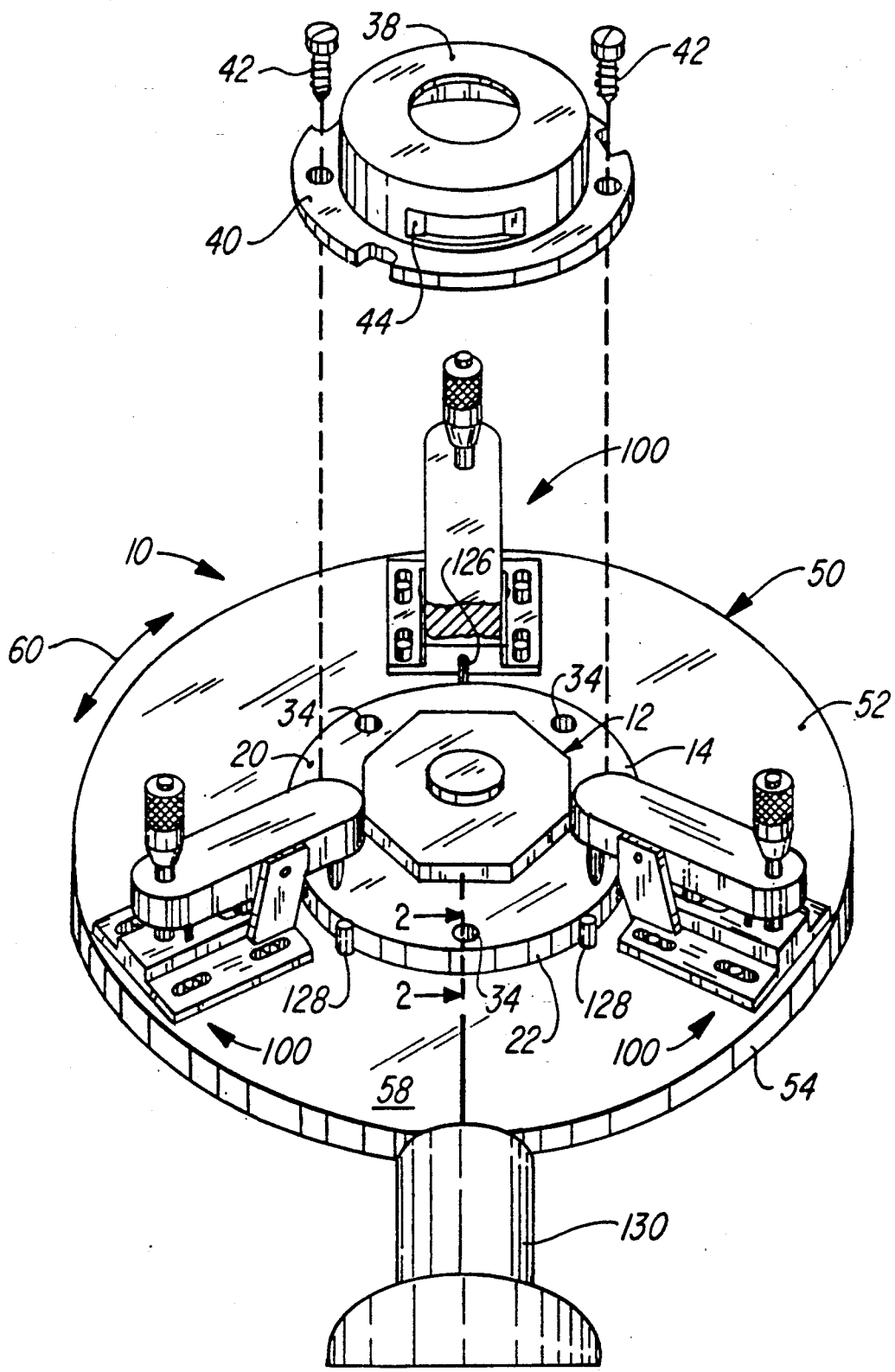
FIG. 1. is a perspective view, partly exploded, illustrating apparatus for aligning an optical device in accordance with the present invention.
Figure 3:
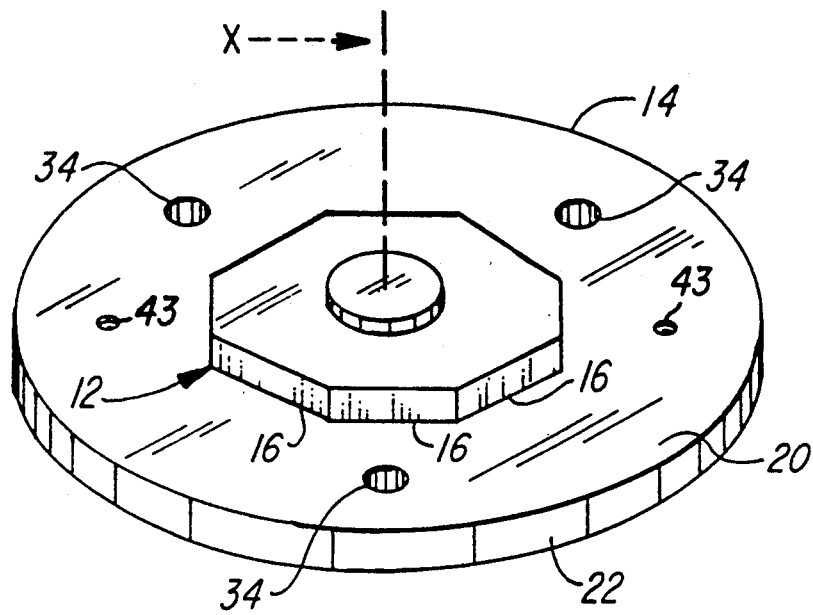
FIG. 3. is an enlarged perspective of the polygon taken from the top as viewed in FIG. 1.
Figure 4:
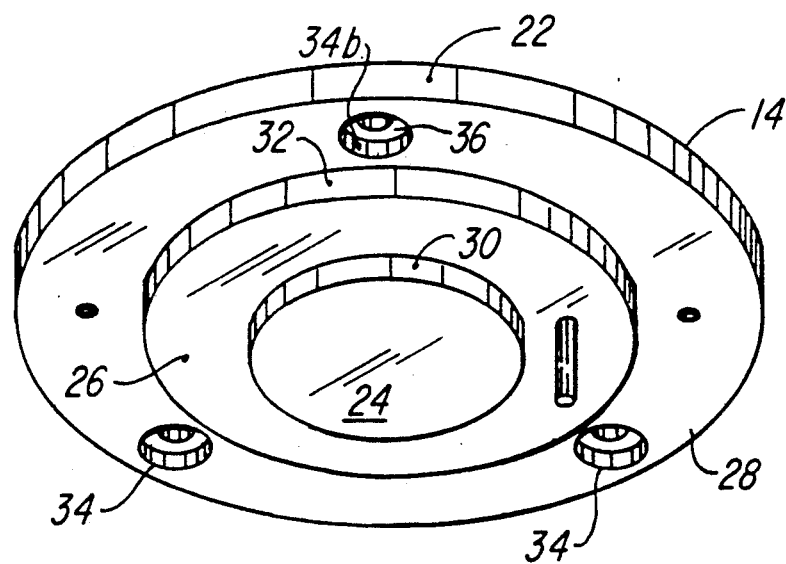
FIG. 4 is a perspective view of the polygon taken from the botton.

Referring initially to FIGS. 1, 3 and 4 of the drawings, an apparatus of the invention is generally designated 10 and is useful for aligning optical devices of various kinds. It is particularly useful for alignment of a polygon 12 that is supported by a housing 14. Polygon 12 comprises a plurality of mirrored surfaces 16, eight of such surfaces being illustrated in the drawings. The polygon is rotatable about an axis X, FIG. 3, which passes through the center of the polygon, and surfaces 16 are positioned around axis X and equally spaced from the axes.

Housing 14 is generally cylindrical in shape and has a circular upper surface 20 and a cylindrical outer wall 22. Surface 20 and wall 22 are coaxial with each other and have an axis that corresponds to the axis X. As shown in FIG. 4, the bottom of the housing 14 comprises a circular inner surface 24 and two annular outer surfaces 26 and 28 which surround surface 24 and are separated therefrom by shoulders 30 and 32.

Housing 14 has three holds 34 therethrough located equal distances from the axis X and positioned outwardly from the polygon. Holes 34 are equally spaced from each other so that they are located at 120° intervals about the axis X. Holes 34 are of a stepped configuration comprising a generally cylindrical portion 34a (FIG. 2) which opens to the upper surface 20 of the housing and a somewhat larger cylindrical portion 34b which opens to the lower surface 28 of the housing. Thus, there is a shoulder 36 betwen portijns 34a and 34b.

When the adjustments for polygon 12 dsescribed later have been completed, the polygon is enclosed by a dust cover 38 (FIG. 1). The dust cover has a flange 40 that rests on the top surface 20 of housing 14, and screws 42 psass through openings in the flange and are threaded into openings 43 (Fig. 3) in housing 14 to hold the dust cover in place. An opening 44 in the cover is located with respect to the mirrored surfaces 16 so that the surfaces are visible through the opening as the polygon is rotated in a laser scanner or the like.

A fixture generally designated 50 is utilized for aligning the polygon. The fixture includes an annular base 52 having an outer wall 54 and an inner wall 56 (FIG. 5) that are substantially coaxial with each other. Inner wall 56 has a diameter that is slightly larger than the shoulder 32 on the bottom of the housing 14 so that the housing can be placed on the upper surface of the base with the shoulder 32 projecting into the opening defined by wall 56 and with the annular surface 28 on the bottom of the housing being positioned just above the surface 58 of the base. The inner wall 56 of the base is large enough relative to shoulder 32 so that some movement of the housing in a radial direction is permitted relative to the base in order to accurately align the housing as described in more detail later. The base is mounted by means (not shown) for rotation about its axis in each of two opposite directions, as indicated by arrow 60 in FIG. 1.

Figure 2:
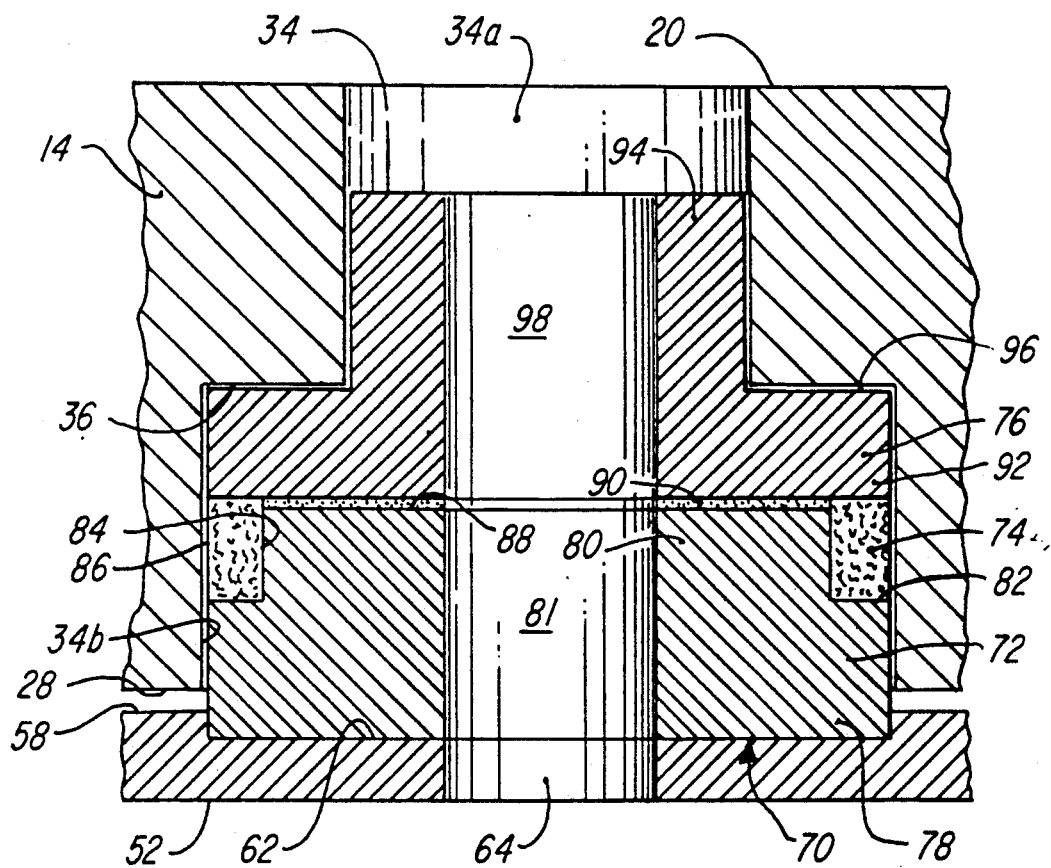
FIG. 2. is an enlarged cross section taken along line 2—2 of FIG. 1 and illustrating one of the pad assemblies used in the apparatus.
Figure 5:
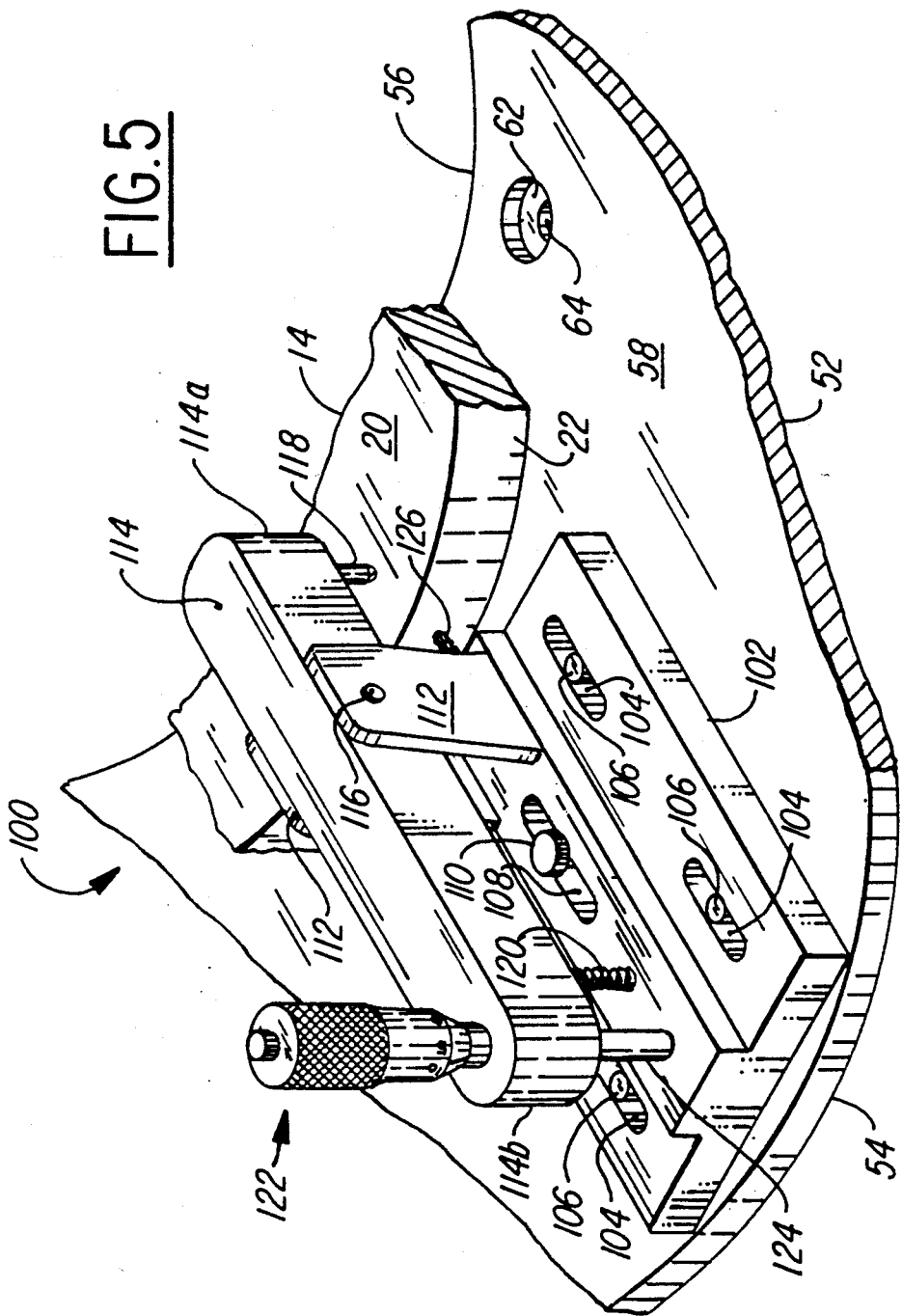
FIG. 5 is an enlarged perspective view of one of the pushers of the apparatus of the invention.

Base 52 has a plurality of circular recesses 62 formed in the upper surface 58, one of which is illustrated in FIGS. 2 and 5. A hold 64 extends through base 52 at the center of each recess 62. These recesses receive portions of the pad assemblies described later. Recesses 62 are precisely located on the fixture so they occupy the same relative positions or attitude as similar features (such as raised pads, not shown) in a laser scanner. This enables a polygon aligned on fixture 50 to be assembled in the scanner without realignment of the polygon.

Figure 6:
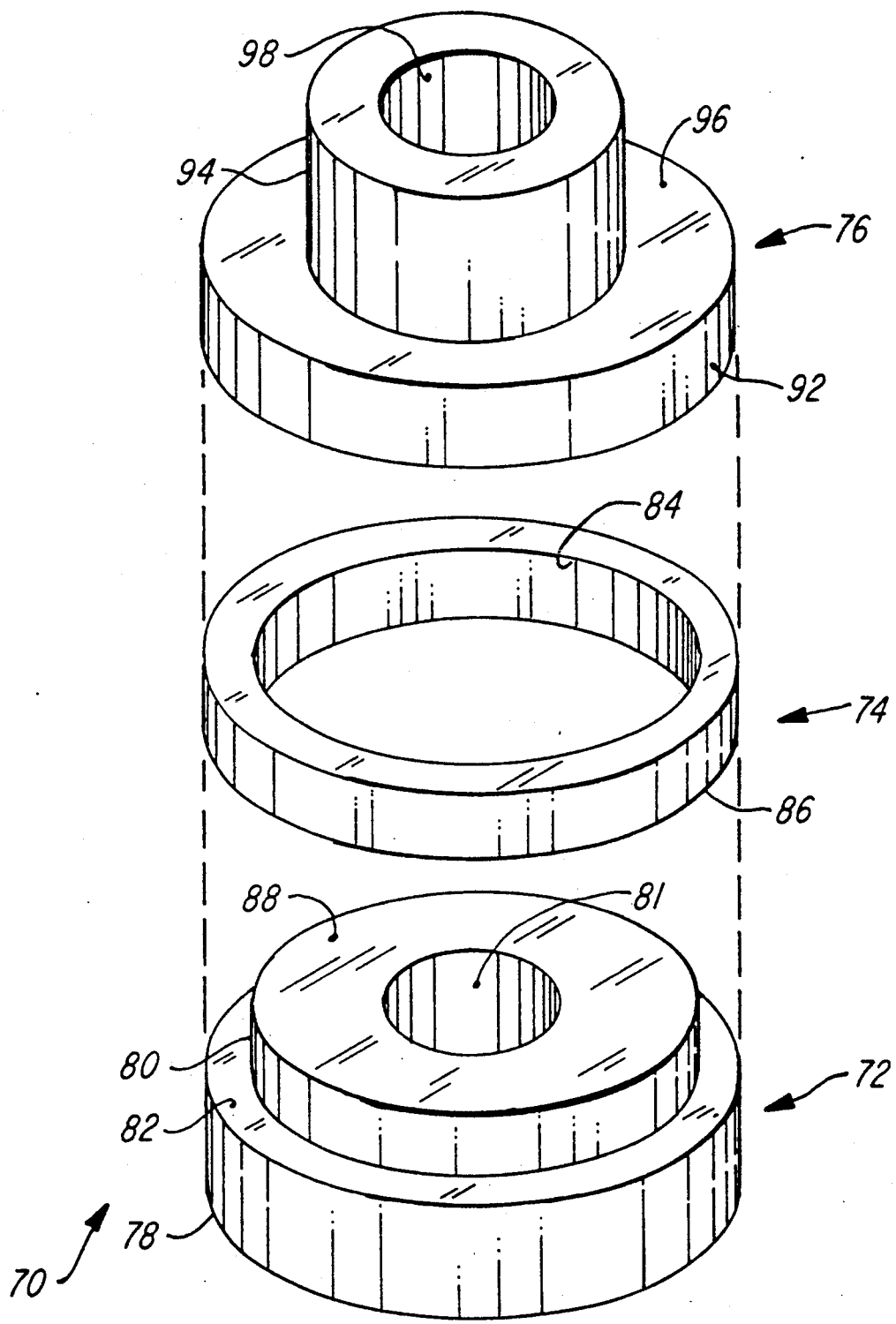
FIG. 6 is an exploded view of one of the pad assemblies.

FIGS 2 and 6 illustrate one of the pad assemblies 70 used for aligning the polygon. The pad assembly includes a mounting plate 72, a ring 74 of compressible material and a bushing 76.

Mounting plate 72 comprises a lower cylindrical portion 78 and a radially smaller upper cylindrical portion 78 and a radially smaller upper cylindrical portion 80. Portions 78,80, are coaxial with each other, and a cylindrical hole 81 extends through the center of the plate. A shoulder 82 at the top of portion 78 surrounds the upper portion 80. The outer diameter of lower portion 78 is dimensioned relative to the recess 62 in base 50 so that the lower portion can fit snugly within the recess, as illustrated in FIG. 2. Also, the outer diameter of lower portion 72 is slightly smaller than the diameter of portion 34b of hole 34 so that housing 14 can slide over the portion 72 of the mounting plate.

Ring 74 is formed of suitable resilient materials, such as rubber, foam, plastics etc. The inner surface 84 of the ring has a diameter substantially equal to or slightly smaller than the outer diameter of portion 80 of the mounting plate. The ring fits closely around plate portion 80, and the lower surface of the ring rests on the shoulder 82 as shown in FIG. 2. The outer surface 86 of the ring has a diameter substantially equal to the diameter of the lower portion 78 of the mounting plate, so that it too fits within the cylindrical portion 34b of hole 34. The height of the ring 74 is greater than the height of the upper portion 80 of the mounting plate, so that the ring projects above the upper surface of the mounting plate, as illustrated in FIG. 2. Thus, the ring surrounds an area defined by the upper surface 88 of the upper portion of the mounting plate and the projecting portion of the ring. This area receives an adhesive 90, such as an epoxy adhesive, used for bonding the mounting plate to the bushing as explained in more detail later. However, the ring prevents adhesive from flowing radially outwardly where it could contact housing 14 and bond the assembly to the housing.

Bushing 76 has a stepped configuration comprising a lower cylindrical portion 92 and an upper cylindrical portion 94 of a somewhat smaller diameter to thereby form an annular shoulder 96. A hole 98 extends vertically through the bushing and is essentially the same diameter as the hold 81 in the mounting plate. The lower portion 92 of the bushing has an outer diameter that is slightly smaller than the diameter of the cylindrical portion 34b of the hold formed in the housing 14. Thus, portion 92 can slide freely within the hold portion 34b. However, the upper portion 94 of the bushing has an outer diameter that is substantially the same as the hold portion 34a so that there is a tight or press fit between the portion 94 and hold portion 34a that will firmly retain the bushing in place within the hold. The bushing is inserted into the hole until the shoulder 96 abuts against the shoulder 36 in the housing, as illustrated in FIG. 2. Portion 94 of the bushing and hold portion 34a could be threaded so the bushing is screwed into the housing 14 instead of being attached by a press fit.

As indicated above, the adhesive secures the mounting plate to the bushing, but the ring prevents adhesive 90 from flowing radially outwardly where it could bond the pad assembly to housing 14. Also, the bushing is retained in the housing by a press fit between bushing portion 94 and hole portion 34a. This provides a substantially permanent mounting of the assembly on the housing, but still enables removal of the entire pad assembly from the housing by forcing the bushing downwardly, as viewed in FIG. 2. Thus, if the polygon is not correctly aligned initially, or if realignment becomes necessary for some reason at a later time, the pad assembly is easily removed and the polygon can be realized with new pad assemblies. This is important for an optical device, such as a polygon assembly, which is so expensive (e.g., about $1,000 U.S.) that it is desirable to realign the device instead of destroying assemblies that are misaligned.

As indicated in FIGS. 1, 3 and 4, three of the holes 34 are provided in housing 14. Three pad assemblies 70 are provided. The bushing 76 of each pad assembly is inserted into one of the holes 34 through the larger cylindrical portion 34b until the shoulders 36,96 are in contact. The press fit between the upper portion 94 and the hole portion 34a secures the bushings in place on the housing 14. The mounting plates of the pad assemblies are located on the three circular recesses 62 of the base 50, and the rings 74 are assembled onto the mounting plates either before or after the plates are placed in the recesses 62. Then adhesive 90 is placed on the upper surface 88 of the mounting plates, and the housing 14 is moved into position over the base 52 so that the rings 74 and mounting plates 72 enter the enlarged portions 34b of the holes 34 until the portions of the pad assemblies are positioned, as illustrated in Fig. 2.

Referring now to FIGS. 1 and 5, three pushers, generally designated 100, are carried by the base 50 of the fixture and are engageable with the housing 14 for urging the housing toward the base during alignment of the polygon, as explained in more detail later. As best illustrated in FIG. 5, each pusher has a generally rectangular base 102 that rests on the upper surface 58 of the fixture base 50. A plurality of slots 104 extend through the base 102, and each slot loosely receives a pin 106 that projects upwardly from surface 58 of the fixture. This pin and slot arrangement allows the pushers to be moved toward and away from the housing 14 along the upper surface 58 of the fixture base. Another slot 108 in the central portion of the base 102 receives a screw 110 having a head thereon that is larger than the width of the slot 108. Screw 110 is screwed into a hole (not shown) in the fixture base 50. When the screw is tightened against the upper surface of the pusher base, the pusher is held stationary with respect to the fixture base. By loosening screw 110 the fixture can be adjusted toward and away from the housing 14.

A pair of supports 112 are secured to the pusher base and project upwardly therefrom. An arm 114 is attached to the upper end portion of these supports by pivots 116 that extend through the supports into the arm between the ends of the arm Arm 114 has an end portion 114a that can be adjusted to a position overlying housing 14 by movement of the pusher relative to the base 52. A pin 118 projects downwardly from the end portion 114a of the arm, and is engageable with the surface 20 of housing 14 by pivoting the arm about the pivots 116. The lower end of the pin is rounded and may, if desired, have a ball rotatable in the end thereof, which engages the surface of the housing 14.

The other end portion 114b of the arm overlies the base 102 of the pusher. A tension spring 120 is connected to the pusher base 102 and to the underside of the arm 114 so that the arm is biased about pivots 116 in a counterclockwise direction, as viewed in FIG. 5. A micrometer screw 122 extends through end portion 114b of the arm and has a rod 124 projecting beneath the arm and into engagement with the upper surface of the pusher base 102. The upper end portion of the screw 122 is similar to a conventional micrometer in that rotation of the upper portion in either of two opposite directions can produce small incremental movement of the rod 124 downwardly or upwardly. When the micrometer screw is adjusted to move arm portion 114b upwardly against the force of tension spring 120, there is a corresponding small incremental movement of pin 118 on the other end portion of the arm downwardly toward housing 14. When the micrometer screw is moved in the oposite direction, the spring 120 is effective to pull end portion 114b of the arm downwardly and lift the pin 118 away from the housing 14.

One of the three pushers 100 is provided with a spring biased pin 126 that projects from the pusher base 102 toward the outer wall 22 of the housing 14. The pusher with pin 126 is shown in FIG. 5 and at the upper portion of FIG. 1. When the housing 14 is initially positioned on the fixture 50, housing wal 22 is adjacent a pair of locating pins 128 (FIG. 1) which project upwardly from the surface 58 of the base 52. Pins 128 are each located about 135° around fixture base 52 from pusher with pin 126 and about 90° from each other. After the housing is initially set on the fixture, the pusher 100 shown at the top in FIG. 1 is moved from a retracted position toward the housing 14 until the arm portion 114a overlies the upper surface 20 of the housing. As this occurs, the pin 126 on the base of the pusher contacts wall 22 of the housing and pushes the housing firmly into engagement with the locating pins 128. Then screw 110 is tightened to firmly lock the pusher 100, at the top in FIG. 1, in place. The spring biased pin 126 together with the locating pins 128 thus serve to accurately establish the position of the housing 14 relative to the fixture in the plane of base 52. When this has been accomplished, the other pushers 100 can also be moved from the retracted position to the position shown in FIG. 1 wherein pins 118 overly the upper surface 20 of the housing, and they too then are locked in position by tightening the respective screws 110 of the pushers.

A conventional auto collimator 130 is used during alignment of a polygon 12. The collimator emits a collimated light beam onto a surface 16 of the polygon. As indicated in FIG. 1, the fixture is adjusted relative to the collimator so that the light beam from the collimator to the surface 16 passes over one of the holes 34 and a pad assembly 70 in the hole. Light reflected from the polygon surface back to the collimator provides an indication of the angular position of the polygon on the fixture. By using the pushers 100, the angular position of the polygon about the axis of the light beam from the collimator is adjusted until the light reflected from the polygon to the collimator indicates the polygon is correctly aligned in the fixture.

Operation of the apparatus for aligning the polygon will now be described. Before the apparatus is used for aligning production polygons that are to be assembled into a laser scanner (or other apparatus), a tool polygon is placed on the fixture 50. The tool polygon is a standard, and the production polygons are to conform to this standard. The printers that receive the production polygons are built so that the tool polygon, or a production polygon aligned to conform to the tool polygon, can be mounted in the printer without realignment. More specifically, the printer has features, such as pads (not shown), located in exactly the same orientation and relative positions as the recesses 62 in the fixture. Thus, once the fixture is aligned to the tool polygon and a plurality of printers are built to receive the tool polygon, or a production polygon that is aligned the same as the tool polygon by using the fixture, the polygons can be mounted in the printers without realignment, and the polygons will be interchangeable in the various printers without readjustment in the printers.

Initially, the tool polygon is set on the rotary base of fixture 50 and the auto collimator 130 determines the position of the tool relative to the fixture. After the first angular position is determined, the fixture base is rotated 120° and the procedure is repeated. The fixture base can again be rotated 120° and the procedure repeated for a third time. Each time the collimator beam is directly over a pad assembly 70 in a hole 34 when measurements are made. Once the angular attitude of the tool polygon on the fixture is known, all production polygons are adjusted with respect to the fixture to match the alignment of the tool polygon.

When a production polygon is to be aligned, the mounting plate 72 of each of three pad assemblies is positioned in the circular recesses 62 in the upper surface of base 52, and the ring 74 for each pad assembly is positioned around the upper portion 80 of a mounting plate. Then a small quantity of adhesive 90 is applied to the area above surface 88 of the mounting plate and radially inwardly from the inner surface of the ring 74. Preferably, the thickness of the adhesive is kept thin to maintain good mechanical strength and to minimize shrinking of the adhesive during curing. By way of example, the thickness of the adhesive can be within the range of 0.002 to 0.018 inches. The ring retains the adhesive on surface 88 and prevents it from flowing radially outwardly into contact with the cylindrical portion 34b of the hole 34. However, when the pushers force bushings 76 of the pad assemblies toward the plates 72, adhesive can flow radially inwardly into holes 81 and 98, thereby avoiding the build up of a high hydrostatic pressure in the adhesive. Such hydrostatic pressure is undesirable because it opposes the movement of bushings 76 toward the plates 72 and thus prevents or complicates alignment of the polygon The bushing 76 of each of the pad assemblies is press fitted into the upper portion 34a of the hole 34 in the housing. Then the housing 14 is placed on the fixture with the bushings 76 being located with respect to the mounting plates 72 and rings 74 in the manner illustrated in FIGS. 2 and 6.

Before the housing is placed on the fixture, each of the pushers 100 is retracted away from the circular inner wall 56 by loosening the screws 110 and manually pulling the pushers toward the outer wall 54 of the fixture. When the pushers are retracted, there is sufficient space to enable the housing to be placed on base 52 as previously explained. Then, the pusher 100 shown at the top in FIG. 1 is moved toward the housing 14 to bring the spring biased pin 126 into engagement with wall 22 of the housing, thereby urging the polygon housing toward the bottom, as viewed in FIG. 1, until the wall 22 is firmly in engagement with the locating pins 128. This locates the housing 14 on the fixture. At this time, screw 110 of the upper pusher is tightened to lock the upper pusher 100 in place. The other two pushers are adjusted in a similar manner to bring pins 118 over housing, and the screws 110 tightened. After these adjustments the parts occupy the relative positions illustrated in FIG. 1 of the drawings. At this time the pin 118 of each of the three pushers is located above surface 14 and midway between the two adjacent holes 34 which receive the bushings 76 of the pad assemblies.

Next, the micrometer screws 122 of the pushers are adjusted to pivot the arms 114 in a direction to force the pins 118 against the housing 14. The pushers can be adjusted to force the housing and polygon downwardly only, or to also pivot the housing and polygon relative to the fixture 50. Adjustment of the pushers at the left and right side of the collimator tilts the housing and polygon about the axis of the light beam from collimator 30. As this occurs, the auto collimator is used to determine when the polygon 12 has been adjusted to positions where it conforms exactly to the position occupied by the tool polygon on the fixture 50. After the polygon face aligned with the auto collimator is aligned, then the fixture base 52 is rotated by 120° and the procedure is repeated. During the alignment process, the bushings 76 of the pad assemblies are urged toward the bases 72, thereby compressing rings 74. When it has been determined that the production polygon is properly adjusted on the fixture, the polygon remains on the fixture until the adhesive 90 is cured. The adhesive bonds the mounting plate 72 and ring 74 of each of the pad assemblies to the associated bushing 76 to form unitary pad assemblies. The assemblies are attached to the housing by the press fit between bushing portion 94 and the housing 14 so that the pad assemblies become part of the production polygon. However, as explained earlier the adhesive does not bond the assemblies to the housing so the assemblies can be removed, if desired, by pushing downwardly on the bushing, as viewed in FIG. 2. This enables a misaligned polygon to be easily realigned instead of being destroyed.

The polygon can be mounted in a printer in any suitable manner. For example, hold down screws can pass through holes 81, 98 in the pad assemblies to secure the polygon in place in the printer.

During the alignment procedure, rings 74 of the pad assemblies are compressed, as explained above. While the rings 74 prevent adhesive from moving radially outwardly, the pressure exerted on the adhesive during alignment is relieved because the adhesive can flow radially inwardly into the holes 81 and 98. Thus, there is little or no hydrostatic pressure opposing adjustment of the pad assemblies during the alignment procedure.

The apparatus of the invention enables very accurate alignment of a polygon (or other optical instrument) and permits adjustment of the angular attitude of the polygon axis of rotation with respect to an established standard (i.e., the tool polygon), which in turn has an established relationship to the printer that receives the polygon. The apparatus is relatively simple and avoids the need for precision (and thus expensive) polygon construction required in some apparatus. Also, polygons aligned in the fixture do not need to be realigned in production printers, thus saving time and expense in manufacture of the printers and when replacing polygons of printers located at a customer facility.

The invention has been described in detail with particular reference to a preferred embodiment thereof, but it will be understood that variations and modifications can be effected within the spirit and scope of the invention.

I claim:

1. Apparatus for aligning an optical device supported by a housing, the apparatus comprising:

a fixture having a base mounted for rotation about an axis, a plurality of adjustable pad assemblies, each of the assemblies comprising (a) a mounting plate removably positioned on the base of the fixture, (b) a bushing secured to the housing of the optical device, and (c) a compressible member supported by the mounting plate with a portion of the compressible member projecting from the plate to form an area on the plate for receiving an adhesive, the housing of the optical device being located on the base by positioning the mounting plates of the assemblies in spaced relation on the base and securing the bushings of the assemblies to the housing and then bringing the bushings into engagement with the compressible members of the assemblies, a plurality of pushers carried by the fixture base and engageable with the housing for urging the housing toward the base, the pushers being independently adjustable to control the position of the housing relative the fixture base about a plurality of axes, the pushers being effective to urge the bushings toward the mounting plates and squeeze the compressible members so that the bushings are in contact with the adhesive, and means for measuring the angular position of the optical device on the housing.

2. Apparatus as set forth in claim 1, wherein each of the pushers has an arm mounted for pivotal movement, a pin on one end portion of the arm, and means for moving the one end portion of the arm toward and away from the fixture base.

3. Apparatus as set forth in claim 2, wherein each of the pushers is mounted for movement relative to the fixture base between (1) a first position wherein the pin of the pusher is engageable with the housing, and (2) a second position wherein the pusher is retracted from its first position to enable the housing to be positioned on the fixture base or removed from the base.

4. Apparatus as set forth in claim 3, wherein each of the pushers has means for locking the pusher in its first position.

5. Apparatus as set forth in claim 2, further comprising a spring connected to the arm for urging the pin away from the housing, and the moving means comprises a micrometer screw secured to the arm for effecting small incremental movement of the pin in response to rotation of the screw.

6. Apparatus as set forth in claim 1, wherein the fixture further comprises a plurality of locating pins carried by the base and engageable by the housing, and one of the pushers is mounted for movement relative to the fixture base toward and away from the housing, the one pusher having means engageable with the housing as the pusher is moved toward the housing for urging the housing toward the locating pins.

* * * * *